United States Patent Office 3,466,253
Patented Sept. 9, 1969

3,466,253
ADDUCTS OF HEXAHALOCYCLOPENTADIENES AND RICINOLEATES AND PRODUCTION OF POLYURETHANE PLASTICS THEREFROM
Cameron K. Lyon, Orinda, and Thomas H. Applewhite, Concord, Calif., assignors to the United States of America as represented by the Secretary of Agriculture
No Drawing. Filed Mar. 20, 1967, Ser. No. 624,238
Int. Cl. C08g 22/44; C08j 1/18
U.S. Cl. 260—2.5                                          10 Claims

ABSTRACT OF THE DISCLOSURE

A hexahalocyclopentadiene is reacted with a ricinoleic ester of a polyhydric alcohol, e.g., glyceryl triricinoleate, to produce a Diels-Alder adduct. The adducts are useful to form plastics—for example, flame-resistant polyurethane foams—by reacting them with a polyisocyanate in the presence of a blowing agent.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the preparation of hexahalocyclopentadiene-ricinoleate adducts and the use of these adducts for the production of flame-resistant plastics, especially polyurethane plastics of a cellular or foamed structure. Further objects of the invention will be evident from the following description wherein parts and percentages are by weight unless otherwise specified.

One phase of the invention concerns the production of adducts of (1) a hexahalocyclopentadiene, especially hexachlorocyclopentadiene or hexabromocyclopentadiene, with (2) a ricinoleic acid ester of a polyhydric alcohol. Typically, in accordance with the invention, the polyhydric alcohol may be ethylene glycol;
1,3-propylene glycol;
1,2-propylene glycol;
1,4-butylene glycol;
1,3-butylene glycol;
1,2-butylene glycol;
butene-1,4-diol;
1,5-pentane diol;
1,4-pentane diol;
1,3-pentane diol;
1,6-hexane diol;
hexene-1,6-diol;
1,7-heptane diol;
diethylene glycol;
glycerol;
diglycerol;
trimethylol propane;
1,3,6-hexane triol;
pentaerythritol;
sorbitol;
mannitol;

and the like. The esters may be those in which all the hydroxyl groups (of the polyhydric alcohol) are esterified with ricinoleic acid, or they may be partially esterified so that some of the hydroxy groups of the alcohol moiety are unesterified. Particularly preferred are the glycerides of ricinoleic acid, i.e., glyceryl mono-, di-, and tri-ricinoleate, and mixtures of any two or more of these. Coming into special consideration is castor oil which is largely the triglyceride of ricinoleic acid.

The adducts are prepared by the usual Diels-Alder technique. The reactants—hexahalocyclopentadiene and ricinoleic acid ester—are mixed together and the mixture is heated at about 80 to 180° C., preferably under an atmosphere of nitrogen or other inert gas. As in other reactions of the type, the rate of addition is increased with increase in temperature. Usually, the reaction is conducted at about 150° C., whereby the reaction rate is enhanced without danger of scorching or other form of decomposition. Usually, it is preferred to employ an excess of the hexahalocyclopentadiene reactant—for example, about 2 moles thereof per double bond in the ricinoleate—to drive the reaction in the desired direction. The unreacted excess can be removed from the reaction product by distillation, preferably under vacuum. It is evident that the particular nature of the adducts can be varied by varying the conditions of the reaction and/or by selection of the starting ester. In general, it is preferred that adducts contain at least one hexahalocylpentadiene group per molecule of adduct. It has further been observed that darkening of the product may be minimized or even prevented by adding to the reaction mixture a minor proportion—for example, 1 to 10%, based on the amount of ricinoleate—of an epoxide which is compatible with the reactants. Typically useful for such purposes are epoxidized soybean oil, epoxidized corn oil, or other expoxidized fats or oils.

The formation of the adducts is believed to involve the addition of the hexahalocyclopentadiene to the double bond of the ricinoleate:

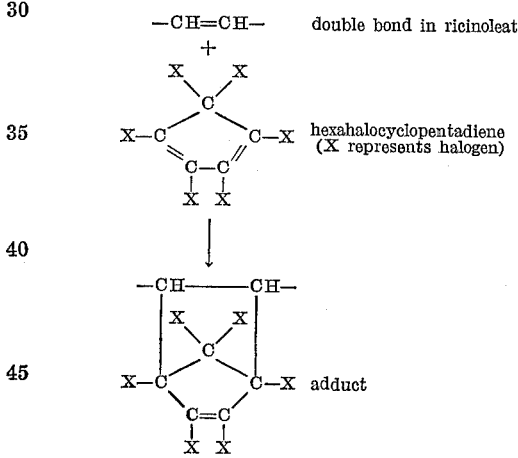

Another phase of the invention concerns the utilization of the aforesaid adducts for the preparation of cellular or non-cellular polyurethane plastics. These polyurethanes are prepared by the same techniques as conventional with known polyols. Thus, the adduct is simply reacted with an organic polyisocyanate. Where a cellular product is desired, a blowing agent is included in the reaction mixture.

Any suitable organic polyisocyanate may be used in the process of the present invention for the preparation of polyurethane plastics including aromatic, aliphatic and heterocyclic polyisocyanates. In other words, two or more isocyanate radicals may be bonded to any suitable divalent or higher polyvalent organic radical to produce the organic polyisocyanate which are useful in accordance with the present invention including acyclic, alicyclic, aromatic and heterocyclic radicals. Suitable organic polyisocyanates are, for example, ethylene diisocyanate,
ethylidene diisocyanate,
propylene-1,2-diisocyanate,
cyclohexylene-1,2-diisocyanate,
m-phenylene diisocyanate, 2,4-toluylene diisocyanate,
2,6-toluylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
p,p',p''-triphenylmethane triisocyanate,
1,5-naphthalene diisocyanate,
furfurylidene diisocyanate, or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate, and the like. Among the preferred polyisocyanates are: the commercially available mixture of 80%, 2,4-toluylene diisocyanate and 20% 2,6-toluylene diisocyanate, and 4,4'-diphenylmethane diisocyanate. Also preferred is polymethylene polyphenylisocyanate, a commercial product containing a mixture of compounds corresponding to the formula below where $n$ is equal to one or more. The chief component of the mixture is the triisocyanate, i.e., $n=1$.

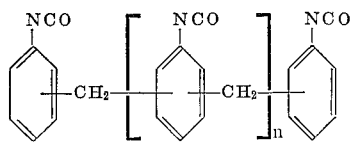

For the preparation of the cellular polyurethane plastics it is preferred to carry out the reaction in the presence of a catalyst including, for example, tertiary amines, such as triethylene diamine, N-ethyl morpholine, N-methyl morpholine, diethyl ethanolamine, N-coco morpholine, 1-methyl-4-dimethyl amino ethyl piperazine, 3-methoxy N-dimethyl propyl amine, N-dimethyl-N'-methyl isopropyl propylene diamine, N,N-diethyl-3-diethyl amino propyl amine, dimethyl benzyl amine, and the like, or a suitable metal catalyst such as those disclosed in U.S. Patent 2,846,408 and particularly iron acetyl acetonate or tin salts of carboxylic acids such as, for example, dibutyl tin di-2-ethyl hexoate, dibutyl tin dilaurate, stannous octoate, stannous oleate, and the like. It is also preferred to use a foam stabilizer in the preparation of the cellular polyurethane plastics together with emulsifiers, coloring agents, fillers, and the like if they are desired. A particularly suitable emulsifier is, for example, sulphonated castor oil, and a particularly suitable stabilizer is a silicone oil such as polydimethyl siloxane and the like. Suitable coloring agents are, for example, carbon black and suitable fillers are vermiculite, sawdust, and the like. Due to their flame-resisting properties, the cellular polyurethane plastics of the invention are particularly useful in the preparation of insulation, and may act as a substance with which to laminate two wall panels together and to produce a substantially rigid structure. For these purposes, considerable aromaticity should be built into the polyurethane by use of an aromatic polyisocyanate, and preferably, if a rigid cellular product is to result, the adduct should have a functionality of at least three. In other words, it should contain at least three free hydroxyl groups per molecule.

In preparing the cellular polyurethanes, the ricinoleate-hexahalocylcopentadiene adduct may be used as the sole polyol in the reaction with the polyisocyanate. However, it is within the scope of the invention to include in the reaction mixture a different polyol in addition to the adduct. Suitable polyols include, for example, glycerol; trimethylol propane; butylene glycol; pentaerythritol; polyalkylene glycols such as polyethylene glycol, polypropylene glycol, and polybutylene glycol; polyether polyols prepared by condensing alkylene oxides such as ethylene oxide, propylene oxide, or butylene oxide with glycerol, trimethylolpropane, pentaerythritol, 1,2,6-hexanetriol, phloroglucinol, sorbitol, or sucrose; polyester polyols such as the reaction products of a polyhydroxy alcohol, e.g., glycerol, ethylene glycol, propylene glycol, polyethylene glycol, and trimethylol propane, with a polycarboxylic acid or anhydride, e.g., adipic acid, succinic acid, malonic acid, sebacic acid, diethylether dicarboxylic acid, maleic anhydride, phthalic anhydride; esters of hydroxycarboxylic acids such as glyceryl mono-, di-, and tri-ricinoleates; and polyhydroxy amino alcohols such as triethanolamine, triisopropanolamine, and N,N,N',N'-tetrakis-(2-hydroxypropyl)ethylenediamine. In preparing rigid polyurethane foams, it is generally preferred to use the adduct in conjunction with about 20 to 150% of its weight of a polyol containing at least three hydroxyl groups per molecule and of relatively low molecular weight (i.e., having a maximum hydroxyl equivalent weight of about 125) e.g., triisopropanol, mixtures of triisopropanol- and triethanolamine, or N,N,N',N'-tetrakis-(2-hydroxypropyl)ethylenediamine.

In preparing the cellular polyurethanes, one can employ any conventional blowing agent. Water, which reacts with the polyisocyanate to form $CO_2$, may be used. A carboxylic acid, preferably of low molecular weight, such as acetic acid, propionic acid, lactic acid, or β-hydroxy propionic acid, can also be used for its $CO_2$-forming reaction with the polyisocyanate. Other suitable foaming agents include inert gases, such as nitrogen or $CO_2$ injected into the reaction mixture under pressure; low-boiling, non-solvent, volatile compounds, such as the "Freons," e.g., trichloromonofluoromethane, dichlorodifluoromethane, dichlorotetrafluoroethane, and the like; and compounds which are decomposed by the heat produced by the exothermic polymerization reaction to form expanding gases, such as azo bis-isobutyronitrile, diazoaminobenzene, 1,1'-azo-bis-(formamide), N,N'-dinitrosopentamethylene tetramine, N,N'-dimethyl-N,N'-dinitroso terephthalamide, benzene sulfonyl hydrazide, ammonium and sodium carbonate and bicarbonate, and the like. In the preparation of foams intended for insulating purposes it is preferred to use, as the blowing agent, a low-boiling inert liquid which is insoluble in the resin, e.g., trichloromonofluoromethane, dichlorodifluoromethane, or mixtures of the two.

In preparing the cellular polyurethanes, one may use a "one-shot" technique wherein all the necessary ingredients—adduct (alone, or with additional polyol), polyisocyanate, blowing agent, etc.—are mixed together to form the foam. In the alternative, one may react an excess of polyisocyanate with the polyol ingredient or ingredients to form an isocyanate-terminated prepolymer and then react this prepolymer with the remainder of the polyol ingredient or ingredients in the presence of the blowing agent, etc. to produce the foam or cellular plastic. The amounts of the various components used will, of course, vary considerably, depending on such factors as the reactivity of the specific reagents and the particular physical characteristics desired in the foam products, such as density, degree of flexibility or rigidity, compressive strength, and the like.

The plastics of the invention in the cellular state are useful, for example, in padding applications, as acoustic or thermal insulation; the non-cellular products are useful in such applications as potting of electrical or electronic components, etc.

The invention is further demonstrated by the following illustrative examples:

Example I.—Preparation of adduct

A mixture was made of 162.2 g. of hexachlorocyclopentadiene and 87.8 g. castor oil. (The stated amounts were calculated to provide 2 moles of hexachlorocyclopentadiene per double bond in the castor oil.) The mixture was heated under a blanket of nitrogen gas, with stirring, for 8 hours at 150° C.

Excess hexachlorocyclopentadiene was then distilled off from the product by heating under vacuum (145° C./ 2 mm. Hg).

The adduct, a dark viscous liquid, was obtained in a yield of 151 g.; chlorine content was 29.5%. Utraviolet analysis indicated that 71% of the double bonds of the castor oil had reacted with hexachlorocyclopentadiene.

Hydroxyl number of the adduct was 107.3, acid No. 1.8.

Example II.—Preparation of polyurethane foam

The adduct prepared as described in Example I was used in preparing a polyurethane foam.

| | G. |
|---|---|
| Adduct (product of Ex. I) | 25 |
| Triisopropanolamine | 20.7 |
| Polymethylene polyphenylisocyanate | 54.2 |
| Monofluorotrichloromethane (blowing agent) | 15.5 |
| Dibutyltin dilaurate (catalyst) | 0.1 |
| Commercial organosilicone surfactant | 1.0 |

The above ingredients were mixed together for about 10 seconds with an electric stirrer, then poured into a mold. Foaming was complete in a minute. The rigid foam so produced was subjected to a series of tests which yielded the following data:

| | | |
|---|---|---|
| Compressive strength | p.s.i. | 35 |
| Density | lbs./cu. ft. | 1.93 |
| Closed cells | percent | 90 |
| Humid aging, 14 days at 70° C., 100% RH (vol. increase) | do | 12 |

In addition, samples of the foam were tested for flammability by the standard test: ASTM Method D1692–59T. All of the samples were found to be self-extinguishing; that is, when the igniting flame was removed, burning of the foam ceased. Moreover, with at least half of the samples tested, the length of burning (with the igniting flame applied) was so short that the foam could be designated as non-burning.

Example III.—Preparation of adduct

A mixture of 85.5 g. (0.314 mole) hexachlorocyclopentadiene and 39.5 g. (0.157 equivalent of carbon-carbon double bonds) of technical pentaerythritol monoricinoleate was heated under a blanket of nitrogen, with stirring for 8 hours at 150° C.

Excess hexachlorocyclopentadiene was then distilled from the product by heating under vacuum (100–150° C./0.6 mm. Hg). The adduct, a dark viscous liquid, was obtained in a yield of 58.4 g. This adduct contained 27.0% chlorine, had a hydroxyl number of 154.4 and an acid number of 4.4.

Example IV.—Preparation of polyurethane foam

The adduct as described in Example III was used in preparing a polyurethane foam.

| | G. |
|---|---|
| Adduct (product of Ex. III) | 15.0 |
| Triisopropanolamine | 10.6 |
| Polymethylene polyphenylisocyanate | 30.2 |
| Monofluorotrichloromethane (blowing agent) | 8.7 |
| Dibutyltin dilaurate (catalyst) | 0.06 |
| Commercial organosilicone surfactant | 0.6 |

The above ingredients were mixed together for about 10 seconds with an electric stirrer, then poured into a mold. Foaming was complete in 1.5 minutes. The rigid foam so produced was subjected to a series of tests which yielded the following data:

| | | |
|---|---|---|
| Compressive strength | p.s.i. | 24 |
| Density | lbs./ft.$^3$ | 2.01 |
| Closed cells | percent | 87 |
| Flammability (ASTM Method D1692–59T) | | Non-burning |

Having thus described the invention, what is claimed is:

1. A polyurethane prepared by a process which comprises reacting:
   (I) an organic polyisocyanate with
   (II) an adduct of hexahalocyclopentadiene and a ricinoleic acid ester of a polyhydric alcohol.

2. The polyurethane of claim 1 wherein the hexahalocyclopentadiene is hexachlorocyclopentadiene.

3. The polyurethane of claim 1 wherein the ricinoleic acid ester is castor oil.

4. The polyurethane of claim 1 wherein the ricinoleic acid ester is pentaerythritol monoricinoleate.

5. A cellular polyurethane prepared by a process which comprises reacting:
   (I) an organic polyisocyanate with
   (II) an adduct of hexahalaocyclopentadiene and a ricinoleic acid ester of a polyhydric alcohol, in the presence of
   (III) a blowing agent.

6. The cellular polyurethane of claim 5 wherein the hexahalocyclopentadiene is hexachlorocyclopentadiene.

7. The cellular polyurethane of claim 5 wherein the ricinoleic acid ester is castor oil.

8. The cellular polyurethane of claim 5 wherein the ricinoleic acid ester is pentaerythritol monoricinoleate.

9. A cellular polyurethane prepared by a process which comprises reacting:
   (I) an organic polyisocyanate,
   (II) an adduct of hexachlorocyclopentadiene and castor oil, and
   (III) triisopropanolamine, in the presence of
   (IV) a blowing agent.

10. A cellular polyurethane prepared by a process which comprises reacting:
    (I) an organic polyisocyanate,
    (II) an adduct of hexachlorocyclopentadiene and pentaerythritol monoricinoleate, and
    (III) triisopropanolamine, in the presence of
    (IV) a blowing agent.

References Cited

UNITED STATES PATENTS

| 3,156,659 | 11/1964 | Robitschek | 260—2.5 |
| 3,208,956 | 9/1965 | Hindirsinn et al. | 260—2.5 |

DONALD E. CZAJA, Primary Examiner

MICHAEL B. FEIN, Assistant Examiner

U.S. Cl. X.R.

260—18